(12) United States Patent
Bednarski et al.

(10) Patent No.: US 12,529,558 B2
(45) Date of Patent: Jan. 20, 2026

(54) METHOD AND DETECTOR FOR IDENTIFYING A MOMENT OF PLASTIC DEFORMATION OF MATERIAL

(71) Applicant: SHM SYSTEM SPOLKA Z O.O. SPOLKA KOMANDYTOWA, Cracow (PL)

(72) Inventors: Lukasz Bednarski, Kielce (PL); Rafal Marek Sienko, Cracow (PL)

(73) Assignee: SHM SYSTEM SPOLKA Z O.O. SPOLKA KOMANDYTOWA, Cracow (PL)

( * ) Notice: Subject to any disclaimer, the term of this patent is extended or adjusted under 35 U.S.C. 154(b) by 294 days.

(21) Appl. No.: 18/254,626

(22) PCT Filed: Nov. 26, 2021

(86) PCT No.: PCT/PL2021/000087
§ 371 (c)(1),
(2) Date: May 26, 2023

(87) PCT Pub. No.: WO2022/114982
PCT Pub. Date: Jun. 2, 2022

(65) Prior Publication Data
US 2024/0295397 A1    Sep. 5, 2024

(30) Foreign Application Priority Data
Nov. 27, 2020 (PL) .................... P.436145

(51) Int. Cl.
*G01B 21/32* (2006.01)
*G01B 7/16* (2006.01)
*G01B 11/16* (2006.01)

(52) U.S. Cl.
CPC .............. *G01B 21/32* (2013.01); *G01B 11/18* (2013.01); *G01B 7/16* (2013.01)

(58) Field of Classification Search
CPC ........... G01B 7/16; G01B 21/32; G01B 11/18
(Continued)

(56) References Cited

U.S. PATENT DOCUMENTS

| 10,612,911 B1 | 4/2020 | Pena, III et al. |
| 2003/0029252 A1* | 2/2003 | Hiebert ............ F17D 5/00 73/862.474 |

(Continued)

FOREIGN PATENT DOCUMENTS

| CN | 104374499 A | * | 2/2015 |
| JP | S6275327 A | * | 4/1987 |

(Continued)

OTHER PUBLICATIONS

KR_20000056288 (Year: 2000).*
(Continued)

*Primary Examiner* — Peter J Macchiarolo
*Assistant Examiner* — Monica S Young
(74) *Attorney, Agent, or Firm* — The Farrell Law Firm, P.C.

(57) ABSTRACT

Method for identifying a plastic deformation of material of an object in situ using strain sensors operating on the principle of electrical resistive strain gauging, fibre optic measurements using fibre Bragg gratings (FBG), vibrating wire sensors ( )VW, distributed fibre optic sensors (DFOS), inductive, capacitive, or piezoresistive sensors, in which in the monitored area (W) subjected to any load condition, there are placed at least four strain sensors ($\varepsilon$s) constituting at least two rosettes (I), (II) turned with respect to each other by any angle ($\alpha$) other than zero and freely shifted with respect to each other by a vector (V) for measuring any plane strain condition, the rotation angle and the displacement of the rosettes (I), (II) are chosen so that no more than two sensors ($\varepsilon$s) between the rosettes are parallel to each other or (Continued)

Figure 1:
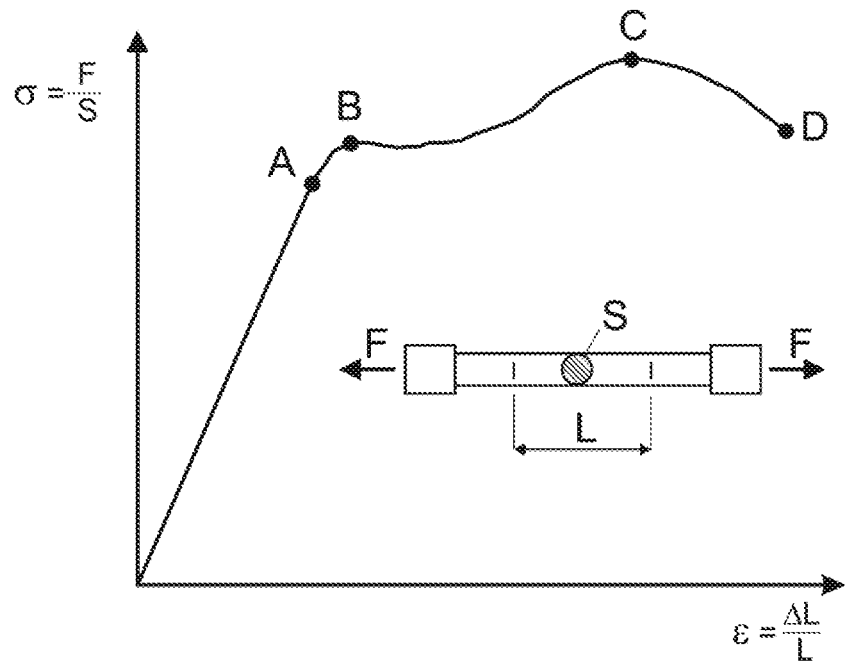

lie on the same straight line, at least two principal strain states ($\varepsilon 1$, $\varepsilon 2$) and principal stresses ($\sigma 1$, $\sigma 2$) respectively are determined for the monitored area (A), and by monitoring the object, increments of principal strains ($\Delta\varepsilon 1$), ($\Delta\varepsilon 2$) and/or increments of principal stresses ($\Delta\sigma\ddot{\imath}$), ($\Delta\sigma 2$) are calculated, in successive moments of time, for each separated rosette, which below the yield point of the monitored area are proportional between the rosettes, on this basis, the plastic deformation of material indices are determined, and by monitoring the area the yield point is detected at the moment of disappearance of the proportionality of the increments, i.e. a sudden change in the value of the determined yield indices normal to the state below the yield point of a given area.

6 Claims, 8 Drawing Sheets

(58) Field of Classification Search
USPC .......................................................... 73/726
See application file for complete search history.

(56) References Cited

U.S. PATENT DOCUMENTS

| | | | |
|---|---|---|---|
| 2018/0195547 A1* | 7/2018 | Demeocq | G01L 5/24 |
| 2020/0309626 A1* | 10/2020 | Mukai | G01L 5/10 |

FOREIGN PATENT DOCUMENTS

| | | | | |
|---|---|---|---|---|
| JP | H06 10645 | | 2/1994 | |
| KR | 20000056288 A | * | 9/2000 | |
| WO | WO-2021068998 A1 | * | 4/2021 | ............... G01B 7/20 |
| ZA | 200 002 042 | | 11/2000 | |
| ZA | 200002042 A | * | 1/2001 | |

OTHER PUBLICATIONS

Translation JP_S627532 (Year: 1987).*
PCT/ISA/210 Search Report issued on PCT/PL2021/000087, Apr. 5, 2022 pp. 4.
PCT/ISA/237 Written Opinion issued on PCT/PL2021/000087, Apr. 5, 2022 pp. 6.
Anonymous, "E-94 Practical Strain Gage Measurements Introduction", Jan. 1, 1999 (Jan. 1, 1999), pp. 94-130, XP055903713, Retrieved from the Internet: URL: https://www.omega.co.uk/techref/pfd/StrainGage_Measurement.pdf, pp. 94, 123.
Megson, T H G, "Complex Stress and Strain" In: "Structural and Stress Analysis", Feb. 17, 2005 (Feb. 17, 2005), Elsevier Science and Technology, XP055903747, pp. 383-420, Retrieved from the Internet: URL: http://freeit.free.fr/Knovel/Structural%20and%20Stress%20Analysis/31961_14/pdf, pp. 401-402, p. 405.
Karl Hoffmann, "An Introduction to Measurements using Strain Gages", 1989, 273 pages.
Robert M. Jones, "Deformation Theory of Plasticity", 2009, 641 pages.

* cited by examiner

METHOD AND DETECTOR FOR IDENTIFYING A MOMENT OF PLASTIC DEFORMATION OF MATERIAL

PRIORITY

This application is a National Phase Entry of PCT International Application No. PCT/PL2021/000087, which was filed on Nov. 26, 2021, and claims priority to Polish Patent Application No. P.436145, which was filed on Nov. 27, 2020, the entire content of each of which is incorporated herein by reference.

The subject matter of the invention is a method and a detector for identifying a moment of plastic deformation of material in situ. The method and detector allow the detection of a moment of plastic deformation of the material without knowledge of the material's stress state and geometric dimensions, technical condition, and without knowledge of material's mechanical characteristics.

In the known state of the art, no method is known for detecting the plastic deformation of material by means of in situ strain measurement without knowledge of the initial stress state of the material, its technical condition, and the mechanical characteristics of the material.

Under a U.S. Pat. No. 8,210,055, rosettes are known for measuring internal stresses during hole drilling tests. The rosette described herein has at least three pairs of opposing dial extensometers positioned on opposite sides of the annealing hole drilling location, all at equal radial intervals and evenly spaced around the centring mark. The dial extensometers located on opposite sides of the hole mark are connected to each other for measurement averaging. According to the description of the method, residual stresses in the material can only be determined up to a value of 0.6 of the limit of proportionality and for known principal directions up to a value of 0.9 of the limit of proportionality. Thus, both the rosettes and the method do not allow for the detection of the state of plastic deformation of the material. The measuring rosettes described above have more than two dial extensometers lying in the same direction, arranged opposite to each other and their readings average each other. The dial extensometers must be analysed together, they are treated as a single system.

Under a U.S. Pat. No. 10,514,251 a solution is known intended for monitoring the technical condition of a structure. It consists of an electronic device and fibre optic sensors arranged in the shape of a measuring rosette with an additional sensor placed next to the measuring rosette for temperature compensation of the measurements. The solution is not intended for detecting a plasticized state of a structure.

In a description US 2019/0277627 A1, structural solutions for measuring rosettes made using fibre Bragg gratings are provided. The structures are intended to be attached to steel by welding. In the description, three-sensor rosettes and four-sensor rosettes are provided. The four-sensor rosette has a square shape and the sensors are parallel to each other in pairs. The solution does not allow to detect a plasticized state of a structure.

EP 1 129 327 B1 patent description presents a design solution for a three-sensor measuring rosette made using the fibre Bragg gratings (FBG) technology. The solution does not allow to determine the plastic deformation state of the material.

In a description US 2016/0377528 A1, a solution designed to analyse the state of a monitored structure from a plurality of fibre Bragg gratings (FBG), connected in measuring chains, arranged in arbitrary shapes on the surface of the monitored structure is presented. Fibre optic sensors measure vibrations induced by an acoustic wave generated by piezoelectric elements. The solution does not allow to detect the state of material plastic deformation.

There is a well-known solution of a four-sensor measuring rosette, described among others in a publication "Hole-Drilling Strain-Gauge Method: Residual Stress Measurement With Plasticity Effects"; Tellini S., Journal of Engineering Materials and Technology 132(1); DOI: 10.1115/1.3184030. This solution is intended to determine stresses in the material by means of the hole-drilling method according to ASTM E837 standard. An additional fourth sensor in the measuring rosette is used to control the correctness of calculations, compensation of temperature impact on the measurement result. By using the fourth sensor in the gauge, and advanced FEA models, it is possible to extend the applicability range of the ASTM E837 method of determining stress in the material in the range from 0.6 to 0.9 of the limit of proportionality. Neither the test method nor the related measuring rosette allow to determine the plasticized state of the material.

The technical problem to be solved according to the invention therefore relates to the detection of the moment of plastic deformation of a material without knowledge of the material's strength characteristics and geometrical dimensions, technical condition and without knowledge of its initial stress state.

The method according to the invention is designed for detecting the moment of plastic deformation of a material in situ when monitoring the technical condition of an object and can be applied using strain sensors operating on the principle of electrical resistive strain gauging, fibre optic measurements using fibre Bragg gratings FBG, vibrating wire sensors VW, distributed fibre optic sensors DFOS, inductive sensors, capacitive sensors, or piezoresistive sensors.

The essence of the method according to the invention is that in the monitored area subjected to any load condition, there are placed at least four strain sensors constituting at least two strain gauge rosettes for measuring any plane strain condition, said rosettes turned with respect to each other by any angle other than zero and freely shifted with respect to each other by a vector. The rotation angle and the displacement of the rosettes are chosen so that no more than two sensors between the rosettes are parallel to each other or lie on the same straight line.

Then, at least two principal strain states and principal stresses respectively are determined for the monitored area, and by monitoring the object, increments of principal strains and/or increments of principal stresses are calculated, in successive moments of time, for each separated rosette, which for each rosette below the yield point of the monitored area are proportional between the rosettes.

On this basis, the plastic deformation of material indices are determined, and by monitoring the area the yield point is detected at the moment of disappearance of the proportionality of the increments, i.e. a sudden change in the value of the determined yield indices normal to the state below the yield point of a given area.

For a plurality of sensors constituting more strain gauge rosettes turned and offset from each other, the plastic deformation of material indices are determined for arbitrarily selected combinations of rosette pairs or for all rosettes simultaneously.

The detector according to the invention for detecting the moment of plasticization of an in situ material in monitoring the condition of an object can be used when using electroresistive strain gauges, fibre optic measurements using fibre Bragg gratings FBG, vibrating wire sensors VW, continuous fibre optic sensors DFOS, inductive sensors, capacitive sensors, or piezoresistive sensors.

The essence of the solution of the detector according to the invention is that it comprises at least four strain sensors mutually positioned such that the strain sensors constitute at least two strain gauge rosettes for determining a plane strain and/or stress state at a measurement location, each strain rosette being three strain sensors positioned on the material to be monitored in different but known directions.

One strain sensor may be a part of one or more strain rosettes but two rosettes, used to detect the plastic deformation, formed from the strain sensors, may not have more than two sensors in common and furthermore the strain rosettes formed by the strain sensors are turned relative to each other by any angle α other than zero. The rosettes are offset from each other by an arbitrary vector.

The directions on which the strain sensors are placed intersect at one or any points while the distance of the strain sensors from the point of intersection of the directions is arbitrary.

The strain sensors are placed on a common carrier, of any shape and material, removable or not after installation of the detector on the monitored object.

Detector is additionally provided with one or more sensors designed to measure temperature changes of the monitored material in order to compensate for temperature effects on the readings of the strain sensors.

The advantage of the solution lies in solving the problem of detecting the moment of plastic deformation of the material without knowing the strength characteristics of the material and its geometrical dimensions, technical condition and without knowing its initial stress state.

Figure 2:
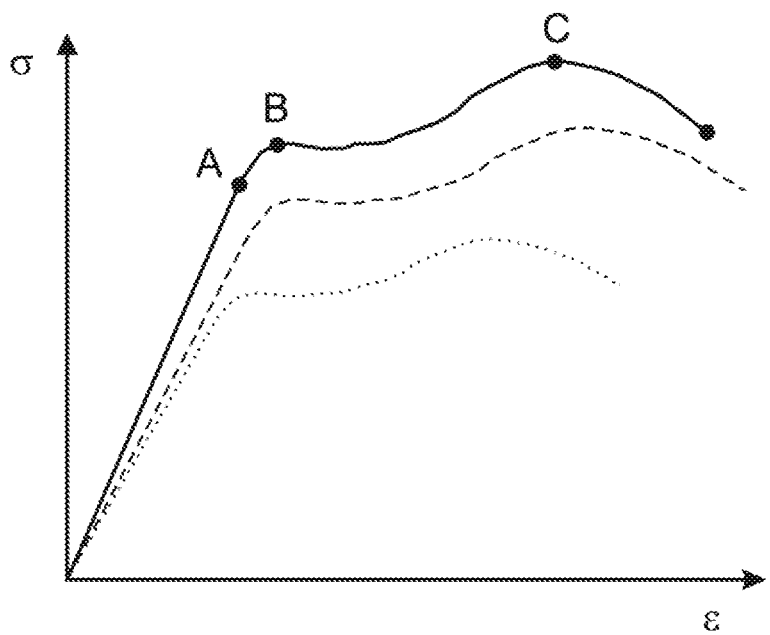
Figure 3A:
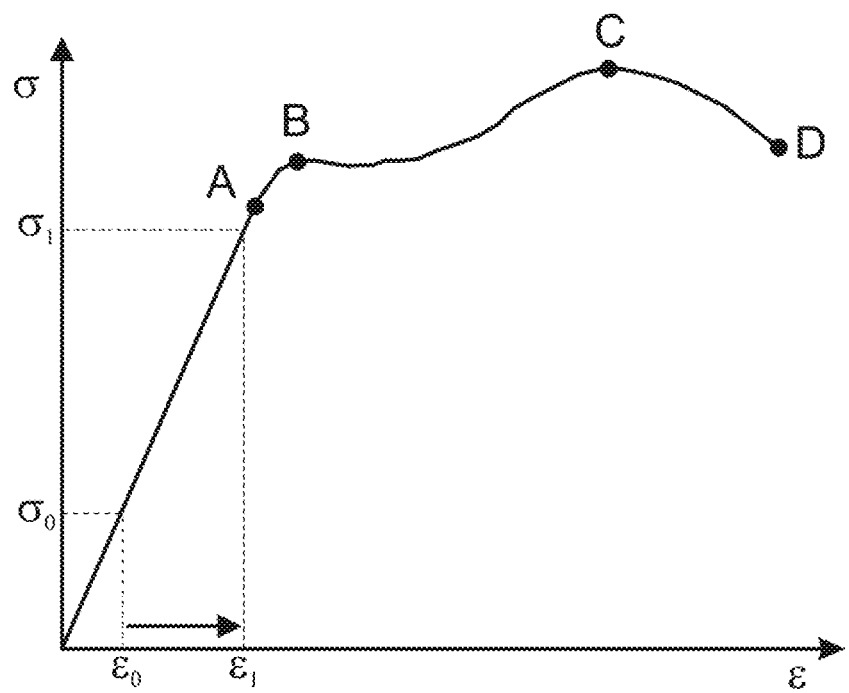
Figure 3B:
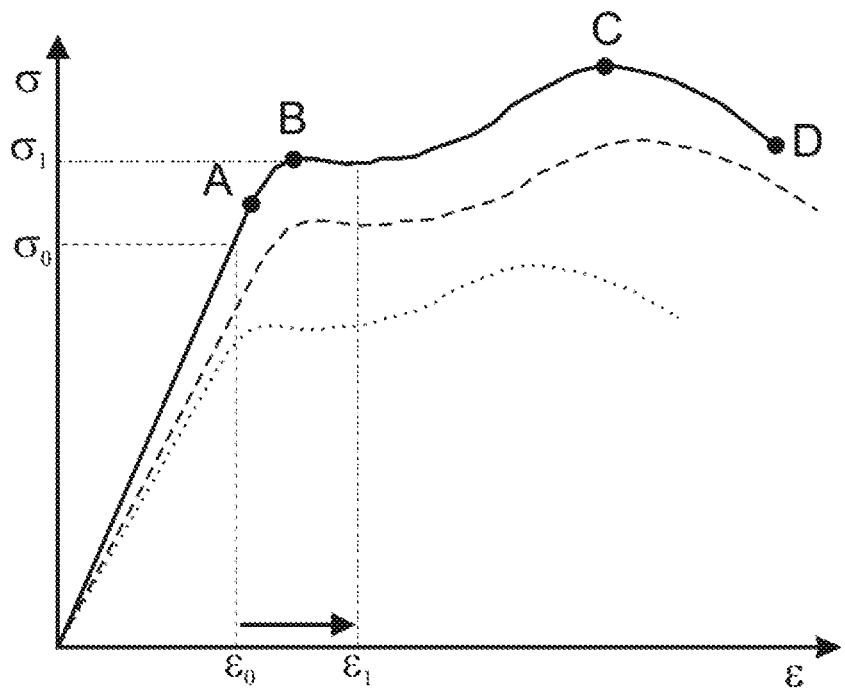
Figure 4:
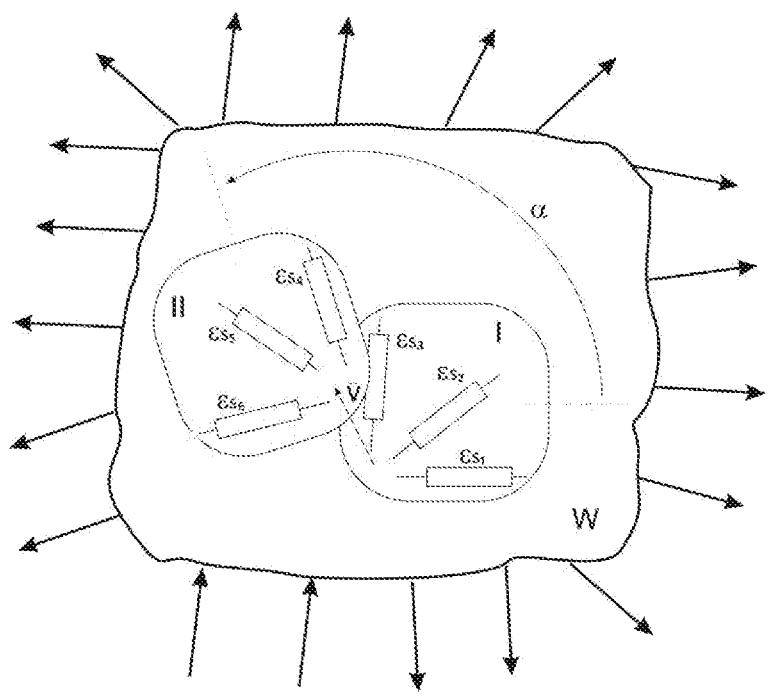
Figure 5:
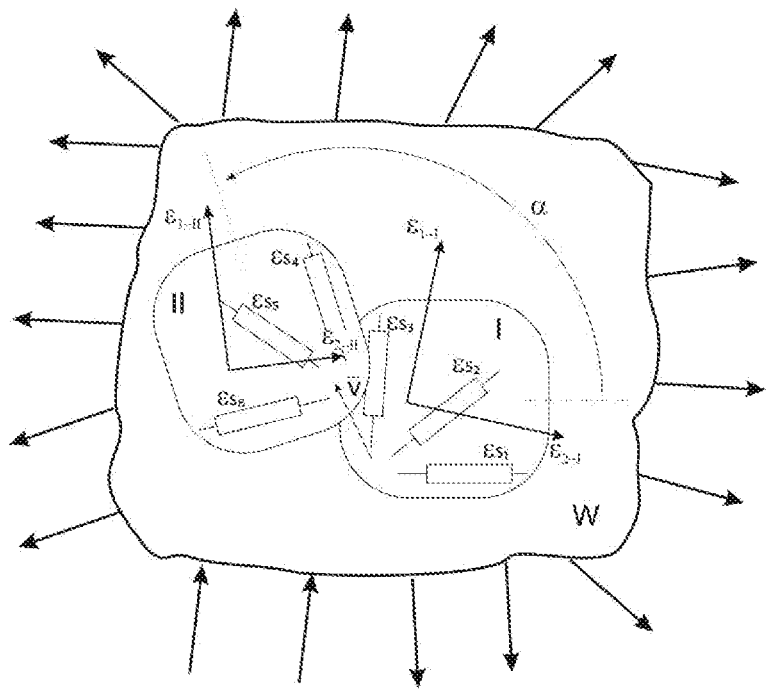
Figure 6:
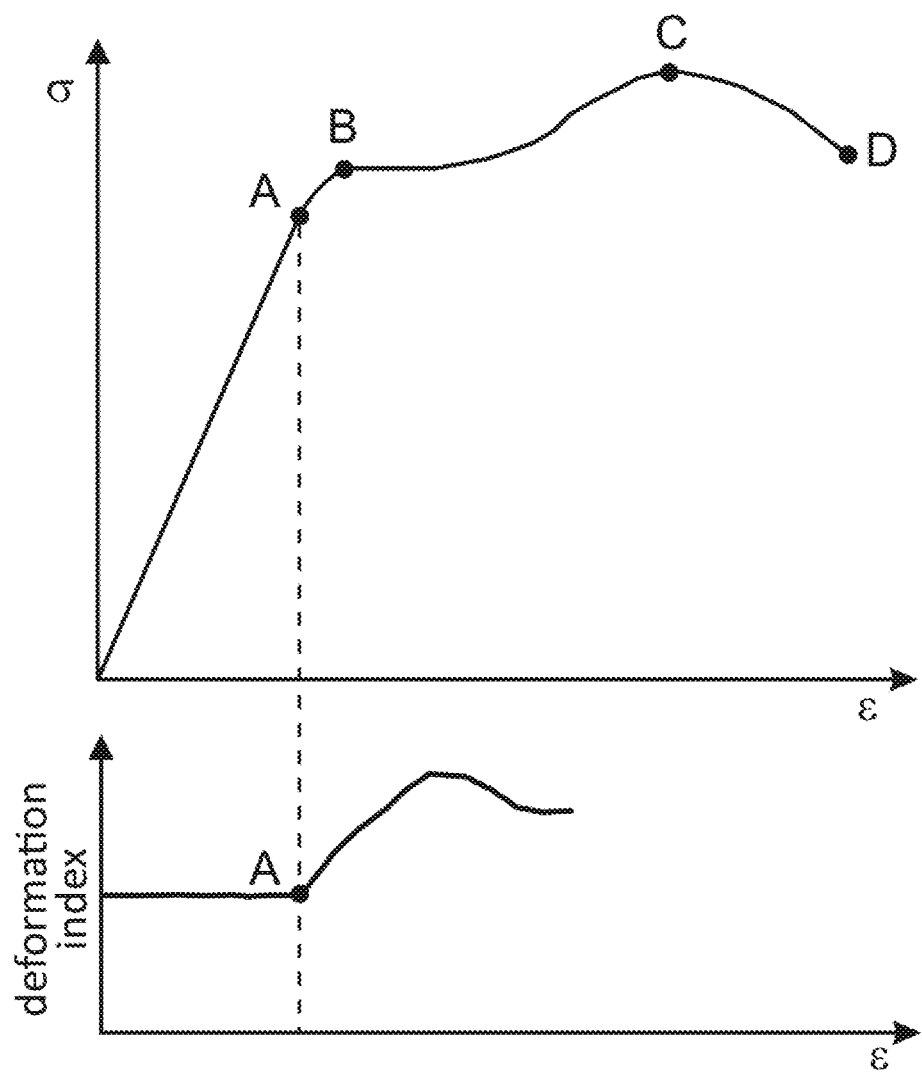
Figure 7:
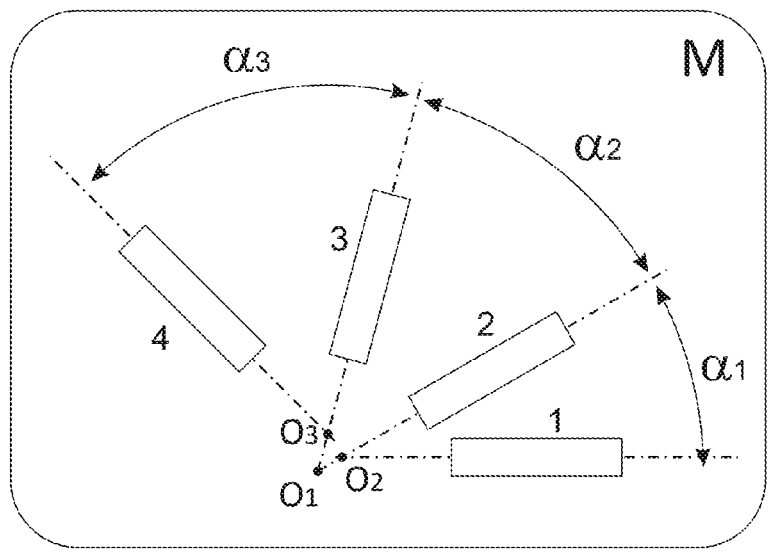
Figure 8:
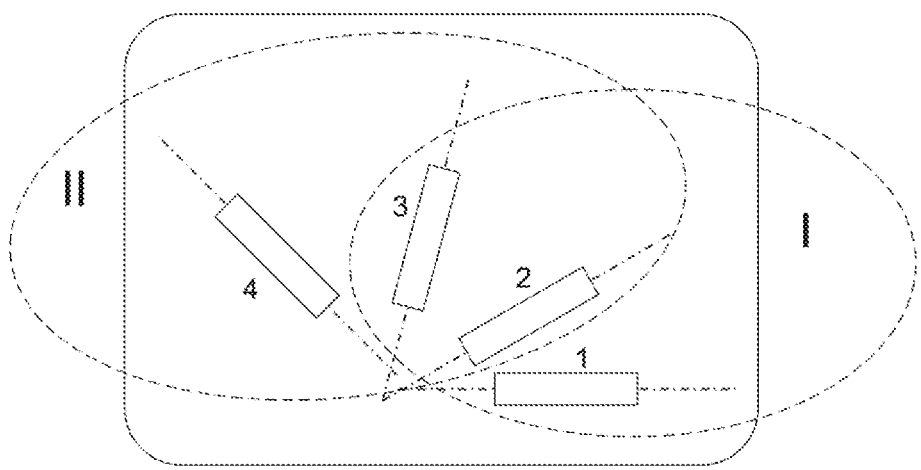
Figure 9:
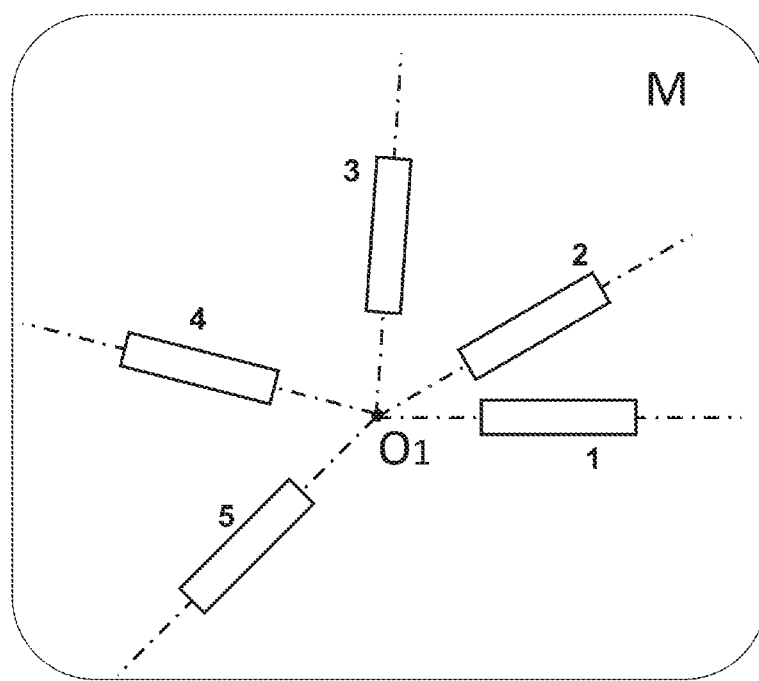
Figure 10:
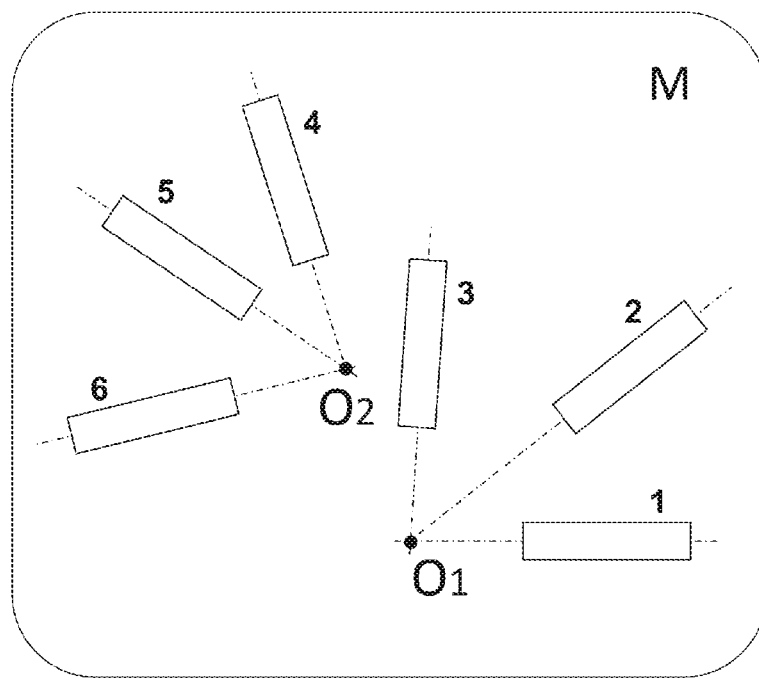
Figure 13:
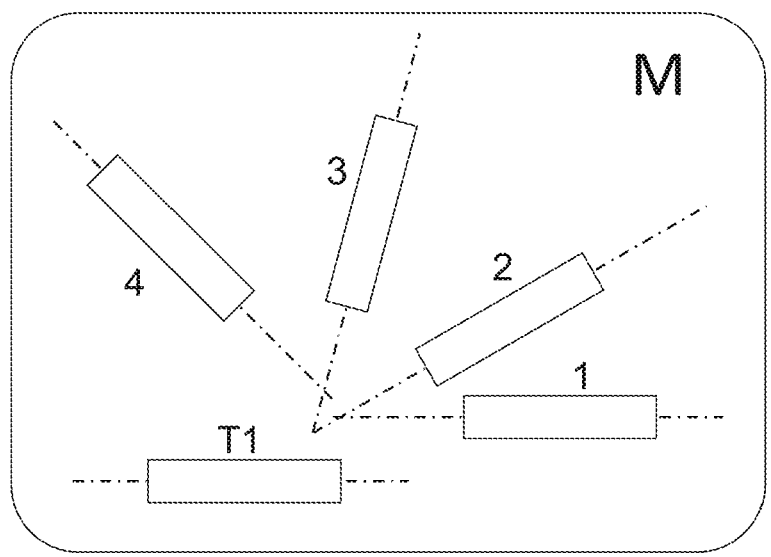
Figure 14:
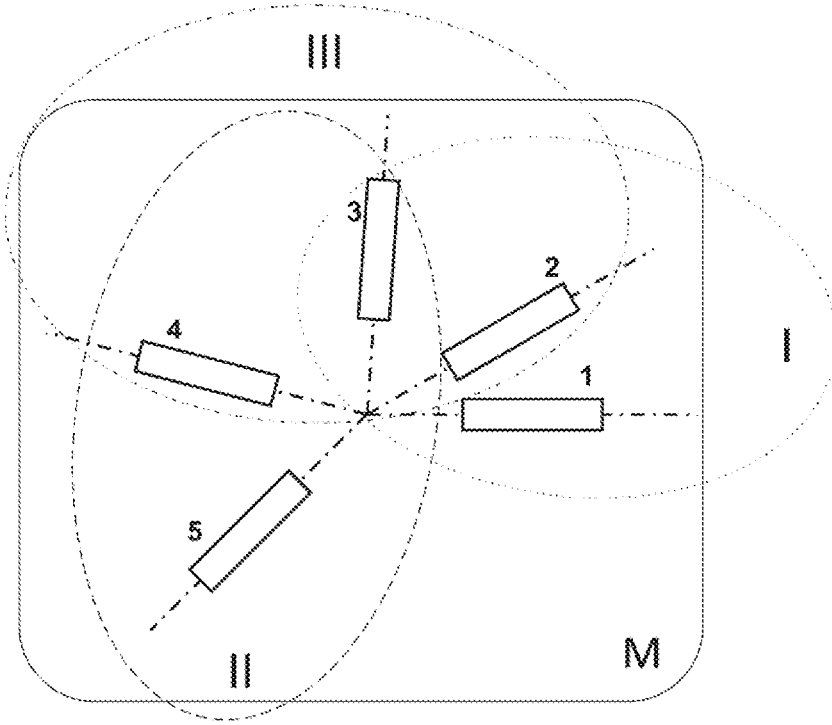

The solution according to the invention is shown with reference to the drawings, wherein the figures represent:

FIG. 1—typical tensile diagram of a material with yield point, F—tensile force of the specimen, S—area of the specimen, L—initial length (base), ΔL—change in length, ε—strain, —stress, FIG. 2—example changes of strength characteristics (dashed line, dotted line) in relation to the standard characteristics (solid line), FIG. 3—two different actual strain states obtained for the same measured strain $ε_1$-$ε_0$; depending on the initial strain $σ_0$ of the element and the actual strength characteristics, different strain values 1 are obtained for the same increment of measured strain $σ_1$: 3a) strain of the material below the yield point, 3b) strain of the material exceeded the yield point of the material, FIG. 4—example of application of the method for six strain sensors—strain sensors εs1 to εs6 placed on the monitored area W, form two rosettes I and II for determining any state of deformation, the rosettes are turned relative to each other by any angle α other than zero and arbitrarily shifted relative to each other by vector V, FIG. 5—the resulting rosette strain sensors, allowing the determination of independent strain and/or stress states for each rosette, FIG. 6—graph showing the rapid change of the plastic deformationplastic deformation index value upon loss of linear material work (plastic deformation), FIG. 7—example of a plastic deformationplastic deformation detector consisting of four sensors, where M—support material providing known orientation of strain sensors relative to each other, 1, 2, 3, 4—strain sensors, α1, α2, α3—mutual angular position of sensors relative to each other, O1, O2, O3—points of intersection of directions, FIG. 8—four strain sensors allow to isolate two dial extensometer rosettes; rosette I—sensors 1, 2, 3, rosette II—sensors 2, 3, 4; the isolated rosettes are turned and shifted relative to each other, FIG. 9—example of a plastic deformation detector consisting of five strain sensors with a common point (O1) of intersection of directions, FIG. 10—example of a plastic deformation plastic deformationdetector consisting of six strain sensors with two points (O1, O2) of intersection of directions; M—support material providing known orientation of strain sensors with respect to each other, FIG. 11—examples of rectangular support material (M), FIG. 12—examples of support material (M) rectangular and matched to the arrangement of sensors, FIG. 13—example of plastic deformation plastic deformationdetector consisting of four strain sensors (1, 2, 3, 4) and one temperature sensor (T1); M—support material, FIG. 14—three dial extensometer rosettes I, II and III formed from a multi-sensor measuring rosette, in the example the rosette has five strain sensors 1, 2, 3, 4, 5 placed on a common support material; sensors 1, 2, 3 form rosette No. I, sensors 3, 4, 5 form rosette No. II, sensors 2, 3, 4 form rosette No. III; it is possible to select successive rosettes consisting of sensors e.g. It is possible to select further rosettes consisting of sensors e.g. 1, 4, 5 or 2, 4, 5 or 1, 3, 5.

All known methods of structural health monitoring (SHM Structural Health Monitoring), which are designed to indicate the stress state of monitored components, require knowledge of the geometry, material's mechanical characteristics, and initial stress state.

Monitoring of changes in the technical condition of elements is possible only after installation of sensors on these elements, i.e. from the moment of starting the observation. The sensors record changes of the monitored quantities, which carry information about the change of stresses occurring in the monitored element. These may include strain, magnetic hysteresis, electrical conductivity, or others depending on the monitoring technique used. The determination of the stress state of the material is made on the basis of a mathematical model and appropriate calculations. The effort of an element so far cannot be measured. Without the knowledge of material type and its strength characteristics, geometry of the element, initial stress state and its technical condition (e.g. degree of corrosion) it is not possible to determine the stress state of the monitored element. This issue will be presented below using a typical yield stress graph of a material as an example.

FIG. 1 shows a typical tensile diagram of a material with a yield point, where A is the end of the limit of proportionality, B is the yield point, C is the strength limit, and D is the rupture of the material. For materials with no apparent yield point, point B will denote the conventional yield point.

The characteristic curve shown in the figure may significantly differ from the theoretical assumptions for a real component.

Examples of changes in the mechanical properties of a material are shown in FIG. 2. The changes may be caused by a number of factors, e.g. change of material cross-section due to corrosion, influence of high or low temperature, influence of gaseous atmosphere, mistakes during material production, e.g. wrong chemical composition.

In FIG. 3 shows an example of changes in the strength characteristics (dashed line, dotted line) with respect to the reference characteristics (solid line).

The effect of the initial condition, and the ignorance of the actual strength characteristics of the component, on the material strain value for the same measured strain values $\varepsilon1-\varepsilon0$ using known monitoring systems is shown. In the case of FIG. 3a the stresses 1 in the monitored material are in the elastic working range, in the case of FIG. 3b they have exceeded the yield strength. The result obtained depends on the knowledge of the initial state of the material at which the $\varepsilon0$ measurements were started. An additional variable affecting the strain of the component is the change in its strength characteristics due to, for example, corrosion of the material.

The subject matter of the invention is a method and a device involving a detector for determining the moment of plastic deformation of a material in situ, without knowing its strength characteristics, technical state and without knowing the initial strain of the material.

The solution according to the invention allows to determine unambiguously the moment when the material stops working in terms of proportional strain (limit of proportionality) and starts working in terms of plastic strain. The method is particularly suitable for use on existing structures, for which it is difficult or impossible to determine the current technical condition and to know the strength characteristics of the material. It is also possible to use this method on newly built structures, on elements not yet loaded.

The solution is based on the installation of strain sensors on the monitored element and an appropriately performed analysis of the obtained measurement data. The configuration of sensors and the method of data analysis allows for unambiguous indication of the moment when the yield point is reached based only on the obtained measurement data, regardless of the initial state of the monitored element and regardless of its technical condition and strength characteristics, which is impossible to be achieved by solutions dedicated to technical condition monitoring known so far. Reaching the yield point is the key moment at which it is still possible to relieve the structure and avoid its catastrophic damage.

The solution takes advantage of the characteristic of materials, which is the transition from their linear work (proportional) to nonlinear work, starting the plastic deformation range of the material. The loss of strain proportionality by the monitored material, upon plastic deformation, can be detected by measuring its strain.

In order to detect plastic deformation of the material, strain sensors $\varepsilon s$ are placed on the monitored area W, which is subjected to any load condition, in such a way that they form at least two rosettes I and II, turned with respect to each other by any angle $\alpha$ other than zero, and arbitrarily shifted with respect to each other by a vector V for measuring any plane strain state (FIG. 4). The rosettes I and II, formed from the $\varepsilon s$ sensors, are used to independently determine two deformation states in the area W. The minimum number of deformation sensors to extract two rosettes turned relative to each other is four.

FIG. 4 shows an example of the application of the method for six strain sensors—strain sensors $\varepsilon s1$ to $\varepsilon s6$ placed on the monitored area W, form two rosettes I and II to determine any strain state. The rosettes are turned with respect to each other by any angle $\alpha$ other than zero and arbitrarily shifted with respect to each other by vector V.

Each of the resulting rosettes allows independent measurement of the state of deformation and/or stress over the monitored area W. The state of deformation and/or stress can be described by, for example, principal strains $\varepsilon1$-I, $\varepsilon2$-I for rosette I and $\varepsilon1$-II, $\varepsilon2$-II for rosette II. (FIG. 5). The rosette strains determined by the strain sensors allow the determination of independent strain and/or stress states for each rosette.

Using the linear description of the material (Hooke's law, Poisson's ratio) one calculates, for instance, increments of principal deformations $\Delta\varepsilon1$, $\Delta\varepsilon2$ and/or increments of principal stresses $\Delta\sigma1$, $\Delta\sigma2$, in successive moments of time, for the separated rosettes I and II. In the range of linear elastic work of the material, the increments of strain and stress, determined at successive moments for each rosette, are proportional to each other (between the rosettes). When the material begins to work in a non-linear, non-proportional, plastic way, the proportionality of the increments between the rosettes disappears. Detecting plastic deformation of a material involves comparing the proportionality, between rosettes, of the strain and/or stress states at successive moments in time. The comparison of strain and/or stress states between rosettes forms the plasticity index. A characteristic feature of the plastic deformation index is a rapid change in its value when the material in the monitored area is plasticized.

FIG. 6 shows such an abrupt change in the value of the plastic deformation index when the linear work of the material is lost (plastic deformation).

If a larger number of strain sensors forming more dial extensometer rosettes turned and offset from each other are placed in the area to be monitored, for example three 3 rosettes designated I, II, and III, the plastic deformation indices can be determined for any combination of rosettes, e.g., I and II, II and III, I and III, or all at the same time (FIG. 8).

In this case, the plastic deformation detector comprises at least four strain sensors positioned reciprocally such that the strain sensors form at least two strain rosettes enabling the determination of a plane arbitrary strain and/or stress state at the measurement location. By a strain rosette is meant three strain sensors which, when placed on the material to be monitored in different but known directions, allow the determination of a planar arbitrary strain and/or stress state at the measurement location.

One strain sensor may be part of one or more dial extensometer rosettes, provided that two rosettes used to detect a plasticizing condition formed by strain sensors may not have more than two sensors in common. The dial extensometer rosettes formed by the strain sensors must be turned against each other through any angle other than zero. The rosettes may also be offset from each other by any vector.

FIG. 7 shows an example of a plastic deformation detector consisting of four sensors. M-support material providing known orientation of strain sensors relative to each other, 1, 2, 3, 4—strain sensors $\varepsilon s$, $\alpha1$, $\alpha2$, $\alpha3$—mutual angular location of sensors relative to each other, O1, O2, O3—points of intersection of directions. Four strain sensors allow to distinguish two rosettes of strain gauges. Rosette I—sensors 1, 2, 3 Rosette II—sensors 2, 3, 4 The separated rosettes are turned and offset relative to each other.

A plastic deformation detector comprising four strain sensors is also shown in FIG. 8. The detector comprises four strain sensors $\varepsilon s$ (1, 2, 3, 4) located relative to each other at arbitrary angles, the directions of the sensors may intersect at one or any points (O1, O2, O3). The distance of the strain sensors from the intersection of the directions is arbitrary. The four strain sensors allow the separation of two dial extensometer rosettes I and II, which are turned with respect to each other by any angle other than zero.

FIG. 9 shows an example of a plastic deformation sensor consisting of five strain sensors εs (1, 2, 3, 4, 5) with a common point (O1) of intersection of directions, FIG. 10—an example of a plastic deformation sensor consisting of six strain sensors with two points (O1, O2) of intersection of directions. M—support material providing known orientation of strain sensors with respect to each other.

The strain sensors are placed on a common support material (M), which allows the strain sensors to be installed on the test material at a known geometric position relative to each other. Knowledge of the mutual position of the strain sensors relative to each other is used to determine principal strains and/or principal directions allowing for a description of the strain state at the measurement location. The shape and size of the support material does not affect the operation of the plastic deformation sensor and may be any shape, such as rectangular, circular, oval, or any way to suit the arrangement of the sensors (FIG. 9).

The sensor support material, may be an element involved in the transfer of deformations from the material to be measured to the deformation sensors, or may be removed after the installation of the sensors on the material to be tested, being only a transport material for the time of installation.

Figure 11:
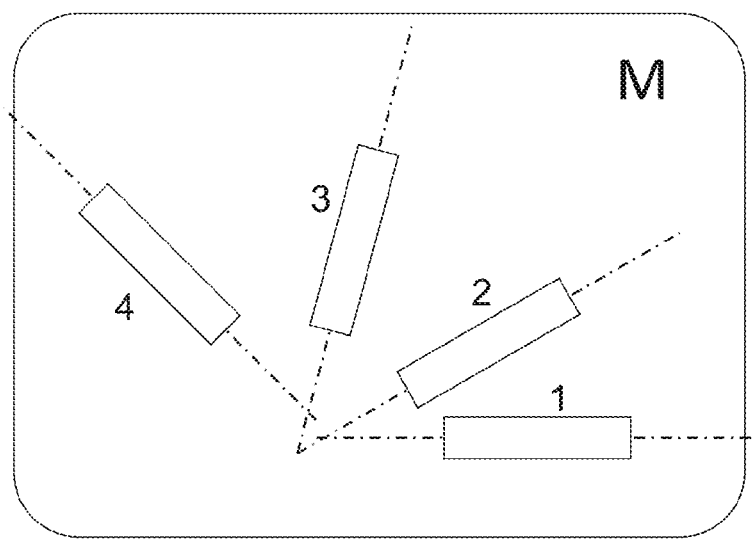

The plastic deformation sensor may additionally be provided with one or more sensors designed to measure temperature changes in the material to be monitored in order to compensate for temperature effects on the readings of the strain sensors. The position of the temperature sensor is arbitrary with respect to the strain sensors. FIG. 11 shows an example of a plastic deformation sensor consisting of four strain sensors εs (1, 2, 3, 4) and one temperature sensor (T1). M—support material.

Figure 12:
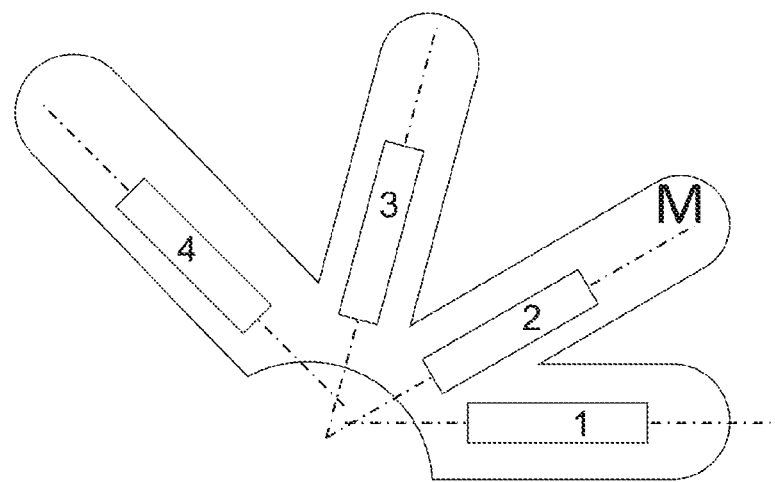

The strain rosettes are extracted from the strain sensors by selecting three sensors each for analysis so that two rosettes analysed together have no more than two sensors in common. Figure FIG. 12 shows an example of extracting rosettes for analysis. Rosette I is formed by sensors 1, 2, 3, rosette II is formed by sensors 3, 4, 5, rosette III is formed by sensors 2, 3, 4. It is also possible to select other threes of sensors while maintaining the condition that two analysed rosettes have at most two sensors in common.

FIG. 12 shows three strain gauge rosettes I, II and III formed from a multi-sensor measuring rosette, in the example the rosette has five strain sensors εs (1, 2, 3, 4, 5) placed on a common supporting substrate. The sensors 1, 2, 3 form rosette I, the sensors 3, 4, 5 form rosette II, the sensors 2, 3, 4 form rosette III. It is possible to select further rosettes consisting of sensors e.g. 1, 4, 5 or 2, 4, 5 or 1, 3, 5

The strain sensors that make up a plastic deformation sensor can measure material deformation based on the principles of electrical resistive strain gauging, fibre optic measurements using fibre Bragg gratings (FBG), vibrating wire sensors VW, continuous fibre optic sensors DFOS, inductive, capacitive, piezoelectric or piezoresistive sensors, magnetostrictive sensors, or any other sensors capable of measuring the deformation of the material being monitored.

The invention claimed is:

1. Method for identifying a plastic deformation of material of an object, the method comprising:

in a monitored area (W) subjected to any load condition, there are placed at least four strain sensors (εs) constituting at least two strain gauge rosettes (I), (II) for measuring any plane strain condition, turned with respect to each other by any angle (α) other than zero and freely shifted with respect to each other by a vector (V) so to define different measurement coordinate systems by an asymmetric arrangement of rosettes, the rotation angle and the displacement of the rosettes (I), (II) are chosen so that no more than two sensors (εs) between the rosettes are parallel to each other or lie on the same straight line, at least two principal strain states (ε1, ε2) and principal stresses (σ1, σ2) respectively are determined for the monitored area (W), by monitoring the object, increments of principal strains (Δε1), (Δε2) and/or increments of principal stresses (Δσ1), (Δσ2) are calculated, in successive moments of time, for each separated rosette, which below the yield point of the monitored area are proportional between the rosettes, on this basis, the plastic deformation of material indices are determined, and by monitoring the area, and the yield point is detected at the moment of disappearance of the proportionality of the increments.

2. Method according to claim 1, characterized in that for a plurality of sensors (εs) constituting more strain gauge rosettes turned and offset from each other, the plastic deformation of material indices are determined for arbitrarily selected combinations of rosette pairs or for all rosettes simultaneously.

3. Detector for identifying a plastic deformation of an object, the detector comprising:

at least four strain sensors (εs) mutually positioned asymmetrically at different angles such that the strain sensors (εs) constitute at least two strain gauge rosettes (I), (II) for determining a plane strain and/or stress state at a measurement location, each strain rosette being three strain sensors (εs) positioned on the material to be monitored in different but known asymmetrically positioned directions, one strain sensor (εs) is a part of one or more strain rosettes but two rosettes, used to detect the plastic deformation, formed from the strain sensors, does not have more than two sensors in common and furthermore the strain rosettes formed by the strain sensors are turned relative to each other by any angle α other than zero and freely shifted with respect to each other by a vector (V) and the turning angle (α) and displacement (V) of the rosettes (I), (II) are chosen so that no more than two sensors (εs) between the rosettes are parallel to each other or lie on the same straight line.

4. Detector according to claim 3, characterised in that the directions on which the strain sensors (εs) are placed intersect at one or any points (O1, O2, O3).

5. Detector according to claim 3, characterised in that the strain sensors (εs) are placed on a common carrier (M) after installation of the detector on the monitored object.

6. Detector according to claim 3, characterized in that it is additionally provided with one or more sensors (T1) designed to measure temperature changes of the monitored material in order to compensate for temperature effects on the readings of the strain sensors (εS).

* * * * *